US008865619B2

(12) United States Patent
Backov et al.

(10) Patent No.: US 8,865,619 B2
(45) Date of Patent: Oct. 21, 2014

(54) METHOD FOR STORING HYDROGEN IN A POROUS MONOLITHIC MATERIAL, COMPOSITE MATERIAL OBTAINED, AND APPLICATIONS

(75) Inventors: Rénal Backov, Bordeaux-Cauderan (FR); Clément Sanchez, Bure sur Yvette (FR); Raphaël Janot, Villers-Bocage (FR); Nicolas Brun, Bordeaux (FR)

(73) Assignee: Universite Pierre et Marie Curie (Paris 6), Paris (FR)

( * ) Notice: Subject to any disclaimer, the term of this patent is extended or adjusted under 35 U.S.C. 154(b) by 553 days.

(21) Appl. No.: 13/126,795

(22) PCT Filed: Oct. 28, 2009

(86) PCT No.: PCT/FR2009/052084
§ 371 (c)(1),
(2), (4) Date: Dec. 16, 2011

(87) PCT Pub. No.: WO2010/049649
PCT Pub. Date: May 6, 2010

(65) Prior Publication Data
US 2012/0082615 A1    Apr. 5, 2012

(30) Foreign Application Priority Data

Oct. 30, 2008   (FR) ..................................... 08 06051
Jul. 27, 2009   (FR) ..................................... 09 55224

(51) Int. Cl.
*B01J 20/00*   (2006.01)

(52) U.S. Cl.
USPC ...................................................... 502/417

(58) Field of Classification Search
USPC ................. 502/417; 423/447.3; 977/742, 743
See application file for complete search history.

(56) References Cited

U.S. PATENT DOCUMENTS 7,267,812 B2 *   9/2007   Takahashi et al. ............. 423/712
2007/0292732 A1 * 12/2007   Feaver et al. ................... 429/33

OTHER PUBLICATIONS

Brun, N., et al. "Hard Macrocellular Silica Si(HIPE) Foams Templating Micro/Macroporous Carbonaceous Monoliths: Applications as Lithium Ion Battery Negative Electrodes and Electrochemical Capacitors". Adv. Funct. Mater. 2009, 19, 3136-3145.*
Brun, N.; Prabaharan, S. R. S.; Morcrette, M.; Sanchez, C.; Pécastaings, G.; Derré, A.; Soum, A.; Deleuze, H.; Birot, M.; Backov, R. Adv. Funct. Mater. 2009, 19, 3136-3145.*
Ordered Mesoporous Polymers and homologous Carbon Frameworks: Ampliphilic Surfactant Templating and Direct Transformation.
First Pd@Organo - Si(HIPE) Open-Cell Hybrid Monoliths Generation Offering Cycling Heck Catalysis Reactions.
Meso/Macroporous Carbon Monoliths from Polymeric Foams.
High Temperature Treatment of Ordered Mesoporous Carbons Prepared by using Various Carbon Precursors and Ordered Mesoporous Silica Templates.
Search Report dated Jul. 12, 2010.
Carbon Monoliths Posessing a Hierarchical, Fully Interconnected Porosity.
Recent Progress in the Synthesis of Porous Carbon Materials.
Hard-Templating Approach Using Silica Si (HIPE) Foams to Generate Micro-Macroporous Carbonaceous Monoliths.
Hard Macrocellular Silica Si (HIPE) Foams Templating Micro/Macroporous Carbonaceous Monoliths: Applications as Lithium Ion Battery Negative Electrodes and Electrochemical Capacitors.

* cited by examiner

*Primary Examiner* — Richard M Rump
(74) *Attorney, Agent, or Firm* — Sofer & Haroun, LLP (57) ABSTRACT

A method is provided for storing hydrogen in a macroporous monolithic material by the heterogeneous nucleation of a metal hydride. A composite material is provided for storing hydrogen directly obtained by the method. A method is also provided for employing the material for the production of dihydrogen, as well as a method for producing dihydrogen using such a composite material.

8 Claims, 4 Drawing Sheets

METHOD FOR STORING HYDROGEN IN A POROUS MONOLITHIC MATERIAL, COMPOSITE MATERIAL OBTAINED, AND APPLICATIONS

RELATED APPLICATIONS

This application is a National Phase application of PCT/FR2009/052084, filed on Oct. 28, 2009, which in turn claims the benefit of priority from French Patent Application Nos. 08 06051, filed on Oct. 30, 2008 and 09 55224, filed on Jul. 27, 2009, the entirety of which are incorporated herein by reference.

BACKGROUND

1. Field of the Invention

The present invention relates to a method of storing hydrogen in a macroporous monolithic material, in particular in a carbon or ceramic monolith having an M2 (macroporous/microporous) hierarchized porous structure and also to a composite for storing hydrogen and to a gaseous hydrogen production process employing such a composite.

2. Description of Related Art

Materials in the form of porous carbon monoliths constitute materials of choice for many applications such as the purification of water and air, adsorption, catalysis in heterogeneous phase, manufacture of electrodes, and energy storage because of their high specific surface area, their large pore volume, their insensitivity to surrounding chemical reactions and their excellent mechanical properties.

These materials have a high specific surface area and a hierarchized structure, i.e. a cellular structure generally having two types of porosity. In particular, they have a mesoporous structure in which the mean pore diameter varies from around 2 to 10 nm.

They may be prepared according to two broad families of processes.

The first broad family of processes uses soft templates and corresponds to what are called "soft templating" methods, i.e. methods employing organic-organic interactions between a thermally crosslinkable polymer (generally a carbon precursor) and certain block copolymers of the nonionic polymer type, such as the products sold under the brand name Pluronic® P123 or F127 by the company BASF, which are used as modeling agent for directly obtaining a porous carbon material after carbonization in an inert atmosphere at 350° C. and pyrolysis (Y. Meng et al., Angew. Chem. Int. Ed., 2005, 44, 2).

The second broad family of processes uses rigid templates and corresponds to what are called "hard templating" or "exotemplating" methods, i.e. methods in which a mesoporous solid template is impregnated with a solution of a precursor of the final material that it is desired to obtain (for example, a carbon precursor) before being carbonized in a nonoxidizing atmosphere.

The invention described hereinbelow employs materials prepared according to a process belonging to the family of hard templating methods.

More precisely, hard templating methods employ templates that may in particular consist of mesoporous silica particles, alumina membranes, zeolites, etc. In particular it is known, for example, from the article by K. P. Gierszal et al., New Journal of Chemistry, 2008, 32, 981-993 that mesoporous carbon monoliths may be prepared by a method using mesoporous silica matrices of the MCM-48 and KIT-6 type having a cubic 3D structure. According to this method, the silica matrices, in powder form, are firstly impregnated with a solution of a carbon precursor which is then crosslinked within the matrices, and then the matrices are carbonized. The carbon material is finally obtained after elimination of the silica template by an acid treatment. It takes the form of a mesoporous material, the pores of which have a mean diameter between 3 and 5 nm approximately and the porous network of which has a structure that corresponds substantially to the negative of the porous network of the template used. Moreover, the preparation of carbon monoliths comprising a macroporous/mesoporous network by impregnation of a solid mesoporous/macroporous silica template with a solution of a carbon precursor such as furfuryl alcohol, which is then polymerized within the template before the latter is eliminated, for example by an acid treatment, has also been described in particular by S. Alvarez et al., Advanced Engineering Materials, 2004, 6(11), 897-899. The carbon monoliths obtained according to the method described by S. Alvarez et al. comprise a macroporous network, which is the positive replica of the macroporous network of the silica template used, and a mesoporous network that corresponds to the negative of the mesoporous network of the silica template used.

At the present time, there is no hard templating method for obtaining materials having a hierarchized porous network comprising a macroporous network, which is the exact replica of the macroporous network of the silica template used, and a microporous network, while still containing no mesoporous network.

Now, it is advantageous to be able to have materials of this type insofar as the presence of a macroporous network enables the impregnation of a fluid such as a reactant within the material to be improved. It is also beneficial to be able to have a material having a certain microporosity, as this increases the specific surface area of the material and improves the confinement reactions in the gas phase (for example, enabling hydrogen to be stored in the gas phase). However, the presence of a mesoporous network in a material that also has a macroporous network is not always desirable as this would have the consequence of embrittling the texture of the watts and therefore impairing the mechanical properties of the material in its entirety. Furthermore, it has been recently demonstrated that the presence of a mesoporous network is not necessary for obtaining high-performance heterogeneous catalysts (S. Ungureanu et al., Chem. Mater., 2008, 20, 6464-6500).

The storage and production of dihydrogen also represent a current major challenge because of technological evolution and the exhausting of petroleum resources. The obsession for portable technologies is generating an increasing demand for systems enabling dihydrogen to be stored and produced in a simple and industrializable manner.

During the last ten years, many research studies have been undertaken to develop technologies intended to allow dihydrogen to be stored under satisfactory conditions from the standpoint of both safety and use. Among such technologies, mention may in particular be made of materials for high-pressure storage reservoirs, dihydrogen liquefaction processes and dihydrogen and metal hydride adsorption materials, these being adapted to a wide variety of both stationary and portable applications. The use of metal hydrides has the advantage of allowing pure hydrogen to be produced. Metal hydrides, especially borohydrides, also have a very high capacity (mass capacity and especially volume capacity) in terms of hydrogen storage. The production of dihydrogen using borohydrides may take place by hydrolysis according to the following theoretical reaction:

$$M(BH_4)_x + 2H_2O \rightarrow M(BO_2)_x + 4H_2 \text{ (with M=Li, Na, Mg, etc.)}.$$

In this case, the dihydrogen may be produced on demand, but no treatment for recycling the borates $M(BO_2)_x$ into borohydrides is presently viable from an economic standpoint. The other means for desorbing large quantities of hydrogen consists in thermally desorbing the borohydrides by heating them to a high temperature, generally to temperatures equal to or greater than 400° C.

OBJECTS AND SUMMARY

It is advantageous to develop hydrogen storage methods making it possible to lower the temperature for desorbing hydrogen from metal hydrides, i.e. making it possible to increase the amounts of hydrogen that it is possible to desorb at temperatures lower than those conventionally used.

The objective of the present invention is to provide a method of storing hydrogen at ambient temperature that makes it possible to obtain a material from which it is possible to produce dihydrogen simply and at temperatures below those that are usually necessary in order to desorb the hydrogen in the form of dihydrogen starting from a metal borohydride.

This objective is achieved by the methods of storing and producing hydrogen that form the subject matter of the present invention and that will be described below. The inventors have in fact developed a material in the form of a carbon or ceramic monolith having an M2 (macroporous/microporous) hierarchized porous structure that can be advantageously used for storing hydrogen by heterogeneous nucleation of a metal hydride in the microporosity of said monolith and to produce dihydrogen by desorbing the hydrogen contained in the composite resulting from the hydrogen storage method.

The first subject of the present invention is therefore a method of storing hydrogen in a cellular solid material in the form of a porous carbon or ceramic monolith comprising a hierarchized porous network comprising macropores of mean size $d_A$ of 1 μm to 100 μm approximately, preferably 4 to 70 μm approximately, and micropores having a mean size $d_I$ of 0.7 to 1.5 nm, said macropores and micropores being interconnected and said material containing no mesoporous network, said method being characterized in that it comprises at least the following steps:

a) a step of degassing said material under a high vacuum and at a temperature of 150 to 400° C. approximately;

b) a step of impregnating, at room temperature, said degassed material with a solution of a metal hydride dissolved in an organic solvent chosen from ethers;

c) a step of drying the material impregnated with the metal hydride solution, said drying being carried out in a low vacuum and at room temperature; and, optionally d) the repetition, one or more times, of steps b) and c) above, In the context of the present invention, the term "monolith" is understood to mean a solid object having a mean size of at least 1 mm.

According to a preferred implementation of this method, the degassing of the material in step a) is carried out at a temperature of approximately 280 to 320° C. and even more preferably at a temperature of approximately 300° C.

The duration of step a) may vary from 2 to 24 hours approximately, and is preferably approximately 12 hours.

According to one preferred embodiment of the invention, the metal hydride is chosen from hydrides of the following formula (I):

$$M(YH_4) \qquad (I)$$

in which M is a lithium or sodium atom and Y is an aluminum or boron atom.

Formula (I) therefore covers lithium borohydride ($LiBH_4$), sodium borohydride ($NaBH_4$), lithium aluminohydride (commonly called lithium alanate) ($LiAlH_4$) and sodium aluminohydride (commonly called sodium alanate) ($NaAlH_4$).

The ether solvents that can be used in step b) may be chosen from aliphatic ethers and cyclic ethers. Among aliphatic ethers, mention may in particular be made of alkyl ethers such as methyl tert-butyl ether (MTBE) or diethyl ether. Among cyclic ethers, mention may in particular be made of tetrahydrofuran. According to a preferred embodiment of the method according to the invention, the solvent for the metal hydride solution is MTBE.

The concentration of the metal hydride solution used in step h) preferably varies from 0.05 to 5M and even more preferably from 0.1 to 0.5M approximately.

The porous carbon or ceramic monoliths that can be used in the hydrogen storage method in accordance with the present invention may be prepared according to a method comprising at least the following steps:

1) a step of preparing a solid silica template in the form of a cellular monolith consisting of a silica or organically modified silica matrix, said monolith comprising macropores having a mean size $d_A$ of 1 μm to 100 μm, mesopores having a mean size $d_E$ of 2 to 50 nm and micropores having a mean size $d_I$ of 0.7 to 1.5 nm, said pores being interconnected;

2) a step of vacuum-impregnating the solid silica template with a solution of at least one carbon precursor or at least one ceramic precursor;

3) a step of polymerizing and/or crosslinking said precursor within the solid silica template;

4) a step of carbonizing the solid silica template containing said polymerized and/or crosslinked precursor; and 5) a step of obtaining said solid carbon or ceramic monolith by elimination of the solid silica template by treatment with an acid or a base, it not mattering whether said treatment is carried, out before or after said carbonization step.

In the context of the present invention, the term "mesoporous network" is understood to mean a network comprising mesopores, i.e. pores having a size that varies from 2 to 50 nm.

The preparation of the silica, template, in the first step, is preferably carried out according to the methods as described in patent applications FR-A1-2 852 947 and FR-A1-2 912 400. These methods generally consist in:

preparing an emulsion by introducing an oily phase into an aqueous surfactant solution;

adding an aqueous solution of at least one silica oxide precursor and/or at least one organically modified silica oxide precursor to the surfactant solution, before or after preparation of the emulsion;

leaving the reaction mixture to rest until said precursor has condensed; and then drying the mixture in order to obtain the expected solid silica template.

In this case, the silica oxide or organically modified silica oxide precursor(s) may be chosen from silica tetraalkoxides of the following formula (II):

$$R'_n(OR)_{4-n}Si \qquad (II)$$

in which:

R represents an alkyl radical having 1 to 5 carbon atoms or a group of the following formula (III):

$$-(CH_2)_m-R_1 \qquad (III)$$

in which 0≤m≤5 and $R_1$ is chosen from a thiol group, a pyrrole group, an amino group, optionally carrying one or more optionally substituted alkyl, alkylamino or aryl substituents, an alkyl group (preferably having 1 to 5 carbon atoms) or a phenyl group optionally carrying an alkyl substituent $R_2$, especially a methyl group;

R' represents an alkyl radical having 1 to 5 carbon atoms or an aryl radical optionally carrying one or more functional groups; and 0≤n<m, m being the valency of the silicon atom.

In one embodiment, the precursor of formula (II) comprises a single type of group of formula (III). In another embodiment, the precursor of formula (II) comprises at least two different types of groups of formula (III).

In particular, the organic group of formula (III) may be:
a 3-mercaptopropyl group;
a 3-aminopropyl group;
an N-(3-propyl)pyrrole group;
an N-(2-aminoethyl)-3-aminopropyl group;
a 3-(2,4-dinitrophenylamino)propyl group;
a phenyl or benzyl group; or
a methyl group.

The precursor or precursors of formula (II) are preferably chosen from tetramethoxysilane; tetraethoxyorthosilane (TEOS), (3-mercaptopropyl)trimethoxysilane, (3-aminopropyl)triethoxysilane, N-(3-trimethoxysilylpropyl)pyrrole, dinitrophenylamino)propyltriethoxysilane, N-(2-aminoethyl)-3-aminopropyl-trimethoxysilane, phenyltriethoxysilane and methyltriethoxysilane.

The use of a precursor of formula (II) comprising at least one group of formula (III) makes it possible to obtain a silica template in which the wetting by the solution of carbon or ceramic precursors is improved. This also makes it possible to optimize the impregnation of the porosity with polymerizable monomers or macromonomers that will give rise to carbon and to various ceramics.

The concentration of silica oxide precursor(s) and/or organically modified silica oxide precursors within the aqueous solution is preferably greater than 10% by weight relative to the weight of the aqueous phase. This concentration varies more preferably from 17 to 35% by weight relative to the weight of the aqueous phase.

The oily phase is preferably formed by one or more compounds chosen from linear or branched alkanes having at least 12 carbon atoms. As an example, dodecane and hexadecane may be mentioned. The oily phase may also be formed by a silicone oil of low viscosity, i.e. less than 400 centipoise.

The amount of oily phase present within the emulsion may be adjusted according to the desired diameter of the macropores to be obtained for the silica template, it being understood that the higher the oil/water volume fraction, the lower the diameter of the oil droplets within the emulsion and likewise the lower the diameter of the macropores.

In general, the oily phase represents from 60 to 90% by volume relative to the total volume of the emulsion. This amount of oil makes it possible to obtain a silica template in which the mean diameter of the macropores varies from 1 to 100 µm approximately.

The surfactant compound may be a cationic surfactant chosen especially from tetradecyltrimethylammonium bromide (TTAB), dodecyltrimethylammonium bromide and cetyltrimethylammonium bromide. When the surfactant compound is cationic, the reaction mixture is brought to a pH of less than 3, preferably less than 1. Tetradecyltrimethylammonium bromide is particularly preferred.

The surfactant compound may also be an anionic surfactant chosen from sodium dodecylsulfate, sodium dodecylsulfonate and sodium dioctylsulfosuccinate (AOT). When the surfactant compound is anionic, the reaction mixture is brought to a pH of greater than 10.

Finally, the surfactant compound may be a nonionic surfactant chosen from surfactants having an ethoxylated head group, and nonylphenols. Among such surfactants, mention may in particular be made of ethylene glycol and propylene glycol block copolymers sold for example under the brand names Pluronic® P123 and Pluronic® F127 by BASF. When the surfactant compound is nonionic, the reaction mixture is brought to a pH of greater than 10 or less than 3, preferably less than 1, and furthermore preferably contains sodium fluoride so as to improve the condensation of the silica oxide precursors.

The total amount of surfactant present within the emulsion may also be adjusted according to the desired diameter of the macropores to be obtained in the silica template. This amount can also vary according to the nature of the surfactant used.

In general, the amount of surfactant varies from 1 to 10% by weight, preferably from 3 to 6% by weight, relative to the total weight of the emulsion.

The step of condensing the silica oxide precursor(s) and/or the organically modified silica oxide precursor(s) is advantageously carried out at a temperature close to room temperature. The duration of this step may vary from a few hours (2 to 3 hours) to a few weeks (2 to 3 weeks) depending on the pH of the reaction mixture.

The silica template obtained at the end of the first step is preferably washed with an organic solvent (such as for example tetrahydrofuran, acetone and mixtures thereof) and then dried (for example in air in an oven or by freeze drying) before undergoing the step of being impregnated by the carbon precursor or ceramic precursor solution.

The carbon precursor or precursors are preferably chosen from phenolic resins, resorcinols, styrene, divinylbenzene, polysaccharides, such as for example saccharose and derivatives thereof, potato starch, lignin, lignocellulosic mixtures and petroleum pitch.

The ceramic precursor or precursors are preferably chosen from preceramic polymers that result in optionally metallic oxycarbonitrides, carbonitrides, nitrides or boronitrides, among which may in particular be mentioned polysilanes, polyalkylsilanes and nitrogen derivatives thereof, polyaminoborazines and derivatives thereof, polyborosilanes, polycarbazides and derivatives thereof, etc.

The carbon and ceramic precursors may take the form of preformed monomers, oligomers or macromonomers or of polymers that are polymerized and/or crosslinked in step 3). When a petroleum pitch is used as carbon precursor, step 3) is not necessarily carried out.

The precursor of the impregnation solution is preferably a carbon precursor and even more preferably a phenolic resin, in particular a phenol-formaldehyde resin.

The solvent for the carbon precursor or ceramic precursor solution is preferably an organic solvent chosen from lower alcohols, such as ethanol, tetrahydrofuran (THF), toluene and mixtures thereof. When the carbon precursor is chosen from phenolic resins, the solvent may also be chosen from water and mixtures of water with at least one organic solvent chosen from the abovementioned solvents in the presence of a base.

The amount of carbon precursor or ceramic precursor in the solution used for the impregnation step may be adjusted according to the desired diameter of the macropores to be obtained in the carbon or ceramic monoliths resulting from the process, it being understood that the lower this amount, the larger the diameter of the macropores and the finer the internal junctions (macropore walls). In general, the amount of carbon precursor or ceramic precursor within the impregnation solution varies from 5 to 90% by weight and even more preferably from 20 to 70% by weight relative to the total weight of said solution.

Step 3) of polymerizing and/or crosslinking the carbon or ceramic precursor(s) may be carried out by any method known to those skilled in the art.

When the precursor is a carbon precursor, such as for example a phenolic resin, a thermal crosslinking operation is carried out.

When the precursor is a carbon precursor, such as for example styrene or divinylbenzene, a crosslinking operation induced by a crosslinking agent, chosen especially from azobisisobutyronitrile (AIBN), potassium peroxodisulfate and sodium peroxodisulfate, is carried out.

When the precursor is a ceramic precursor, a polymerization operation and then a crosslinking operation are carried out, it being possible for both these operations to be induced thermally or photochemically.

The step of carbonizing the silica template impregnated with a polymerized and/or crosslinked carbon or ceramic precursor is generally carried out in a reducing atmosphere at a temperature varying from 500 to 1200° C. approximately, for a time of 3 to 12 hours approximately.

As indicated above, the step of eliminating the silica template may be carried out either before or after the carbonization step, the order in which these two steps are carried out having no impact on the structure of the porous network of the resulting monolith.

This step of eliminating the silica template is preferably carried out by immersion of the polymerized and/or crosslinked-precursor-impregnated silica template, or the carbon or ceramic monolith resulting from the carbonization, in an acid solution, such as for example a hydrofluoric acid solution, or in a basic solution having a pH greater than 9, such as for example in a sodium hydroxide or potassium hydroxide solution. The duration of this treatment is not critical provided that it results in the complete elimination of the silica template. Generally, this duration varies from 12 to 24 hours.

Another subject of the invention is the composite resulting from the hydrogen storage method in accordance with the invention and as described above.

This composite is in the form of a porous carbon or ceramic monolith comprising a hierarchized porous network comprising macropores of mean size $d_A$ of 1 μm to 100 μm approximately, preferably 4 to 70 μm approximately, and micropores having a mean size $d_I$ of 0.7 to 1.5 nm, said macropores and micropores being interconnected and said material containing no mesoporous network, said composite being characterized in that the micropores contain hydrogen in the form of a crystalline, semicrystalline or amorphous metal hydride.

In this composite, the macropore walls generally have a thickness of 0.5 to 40 μm and preferably 2 to 25 μm.

According to the invention, the micropores are present within the thickness of the macropore walls, thus rendering them microporous.

The specific surface area of the composite according to the invention is generally from 50 to 900 m²/g approximately, preferably 100 to 400 m²/g approximately.

According to a preferred embodiment of the invention, the volume of the micropores is greater than or equal to 0.30 cm³/g of composite monolith and the metal hydride is in this case in amorphous form.

The content of hydrogen present in the metal hydride form in the composite according to the invention will vary according to the microporous volume and to the specific surface area of the monolith used in the impregnation step b) and to the metal hydride concentration of the solution used to impregnate said monolith. In general, the hydrogen content varies from approximately 0.004 to 0.08 mol of hydrogen per gram of monolithic carbon. This molar amount corresponds to a mass capacity of 0.6 to 8.1% approximately (i.e. the mass of hydrogen stored relative to the total mass of the composite).

Another subject of the invention is the use of a composite as defined above for the production of dihydrogen, especially for delivering dihydrogen into a fuel cell operating with dihydrogen.

Finally, the last subject of the invention is a dihydrogen production process employing a composite according to the present invention. The process is characterized in that the composite as defined above is subjected to a heating step at a temperature of at least 100° C. Preferably, the heating step is carried out at a temperature of 250 to 400° C.

At a temperature of at least 100° C., the evolution of dihydrogen is observed after desorption of the hydrogen from the metal hydride contained in the micropores of the composite according to the invention.

BRIEF DESCRIPTION OF THE DRAWINGS

FIG. 1(a)-1(e); show macroscopic views of the monoliths obtained after each of the three steps of the method in accordance with one embodiment;

DETAILED DESCRIPTION

The present invention is illustrated by the following embodiment examples, to which the invention is not however limited.

EXAMPLES

The raw materials used in the following examples are listed below:
- 98% tetradecyltrimethylammonium bromide (TTAB), from Alfa Aesar;
- 98% tetraethoxyorthosilane (MOS), from Aldrich;
- 99% acetone and dodecane, from Rectapur;
- tetrahydrofuran (THF), 48% hydrofluoric acid and 37% hydrochloric acid, from Analar Normapur;
- phenol-formaldehyde resin sold in the form of a hydroalcoholic solution of prepolymers, under the name Ablaphene® RS 101 from Rhodia;
- commercial $LiBH_4$ powder sold by Acos Organics; and
- 99.8% pure methyl tert-butyl ether (MTBE) sold by Sigma-Aldrich.

These raw materials were used as received from the manufacturers, without additional purification.

The various monoliths obtained in the examples were characterized on various size scales.

The mesoporosity was characterized qualitatively by TEM (transmission electron microscopy) using a Jeol 2000 FX microscope having an acceleration voltage of 200 kV. The specimens were prepared by depositing silica powder backbones on a copper grid coated with a carbon Formvar@ membrane.

The macroporosity was characterized qualitatively by SEM (scanning electron microscopy) using a Hitachi TM-1000 scanning microscope operating at 15 kV. The specimens were coated with gold or palladium in a vacuum evaporator before they were characterized.

The specific surface area measurements were made by nitrogen adsorption-desorption using a machine sold under the name Micromeritics ASAP 2010, the analysis being carried out by the BET method or the BJH method.

The macroporosity was quantified by mercury intrusion measurements using a machine sold under the name Micromeritics Autopore IV, in order to obtain the characteristics of the macroscopic mineral cells making up the inorganic backbone.

The specimens were subjected to XRD (X-ray diffraction) analysis using a D8 Advance diffractometer sold by Bruker (anode, $CuK_\alpha$ radiation, $\lambda=1.54056$ Å) fitted with a PSI detector. Because of the high reactivity of $LiBH_4$ to air and to moisture, a hermetically sealed specimen carrier fitted with a beryllium window was used. This device is responsible for the presence of reflections corresponding to metallic Be in the X-ray diffraction patterns.

Calorimetric analyses were carried out under a stream of argon (100 cm$^3$/min) using a differential scanning calorimeter sold under the reference DSC 204 by Netzsch, using stainless steel crucibles sealed by a cover, the latter being perforated just before the analysis so as to allow the hydrogen to escape during the heating.

Example 1

Preparation of Macroporous and Microporous Carbon Monoliths

In this example, the preparation of various carbon monoliths of macroporous/microporous double porosity from a microporous/mesoporous/macroporous silica monolith is illustrated.

1) First Step: Synthesis of a Microporous/Mesoporous/Macroporous Silica Monolith (MSi).

5 g of TEOS were added to 16 g of an aqueous 35% TTAB solution preacidified with 7 g of HCl. The mixture was left to hydrolyze until a single-phase hydrophilic medium (aqueous phase of the emulsion) was obtained. Next, 35 g of dodecane (oily phase of the emulsion) were added drop by drop to this aqueous phase, with stirring. The emulsion was then left to condense in the form of a silica monolith for a week at room temperature. The silica monolith thus synthesized was then washed with a THF/acetone (50/50 v/v) mixture in order to extract the oily phase therefrom. The silica monolith was then dried for one week at room temperature and then subjected to a heat treatment at 650° C. for 6 hours, applying a rate of temperature rise of 2° C./min, with a hold at 200° C. for 2 hours. A silica monolith denoted MSi was obtained.

2) Second Step: Impregnation of the Silica Monolith with Phenolic Resin

The silica monolith MSi obtained above was cut into five identical pieces of 0.5 g each using a hand saw.

The following two Ablaphene® RS 110 phenolic resin solutions were also prepared:
Solution S25: 25 wt % Ablaphene® RS 110 in THF;
Solution S80: 80 wt % Ablaphene® RS 110 in THF.

A 0.5 g piece of silica monolith was then immersed in each of the solutions, S25 and S80, in a beaker. The beakers were placed under vacuum until the effervescence disappeared, so as to ensure proper impregnation of the silica matrices with the phenolic resin solutions. After stirring for 24 hours at room temperature, each of the solutions was filtered.

The silica monoliths thus impregnated with solutions S25 and S80, MSiS25 and MSiS80 respectively, were then quickly washed with THF and then dried in an oven at a temperature of 80° C. for 24 hours so as to facilitate the evaporation of the solvent and thermally initiate the crosslinking of the phenolic resin monomers. Each of the monoliths MSiS25 and MSiS80 then underwent a second heat treatment in a hot-air oven at 155° C. for 5 hours, with a rate of temperature rise of 2° C./min, with a first hold at 80° C. for 12 hours and then a second hold at 110° C. for 3 hours. The monoliths were then left to return to room temperature by simply turning the oven off. Silica monoliths impregnated with a crosslinked phenolic resin (hybrid monoliths of the $MSiS_{cross}$ type) were thus obtained. These monoliths are denoted by $MSiS25_{cross}$ and $MSiS80_{cross}$ respectively. The $MSiS25_{cross}$ monolith was prepared in duplicate.

3) Third Step: Synthesis of Carbon Monoliths

Two synthesis routes were employed.

According to the first synthesis route, one of the monoliths, $MSiS25_{cross}$, as obtained above after the second step, was immersed in three successive 10% hydrofluoric acid baths and then washed copiously with deionized water. This treatment with hydrofluoric acid resulted in the silica template being eliminated. The monolith resulting from this treatment was then dried in a hot-air oven overnight at 80° C. After drying, the monolith was subjected to a pyrolysis at a temperature of 900° C. for 1 hour in a stream of nitrogen, with a rate of temperature rise of 5° C./min being respected. The graphitized carbon monolith thus Obtained was denoted by $MS25_{carb}$.

The second synthesis route was applied to the other $MSiS25_{cross}$ monolith and to the $MSiS80_{cross}$ monolith. According to this second route, the order of carrying out the hydrofluoric acid treatment, and the pyrolysis was simply reversed, each of these two steps nevertheless being carried out in a manner identical to the operating mode used to produce the $MS_{carb}$ monoliths. The graphitized carbon monoliths thus obtained were denoted by $MS25_{HF}$ and $MS80_{HF}$ respectively.

4) Characterizations

Figure 1:
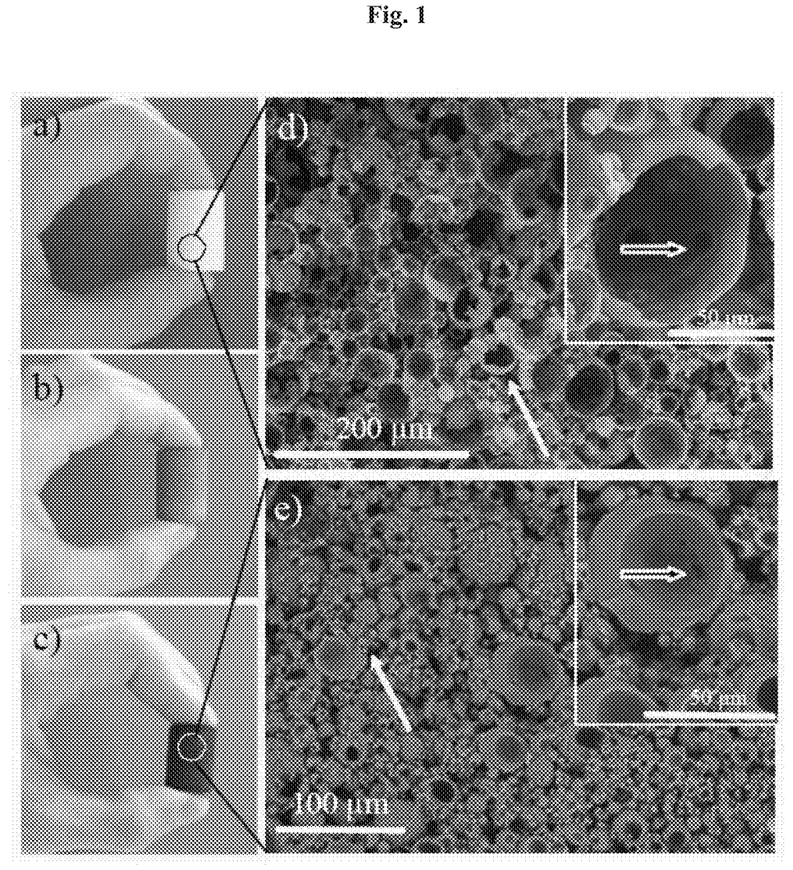

The appended FIG. 1 shows macroscopic views of the monoliths obtained after each of the three steps of the method: FIG. 1a) corresponds to an MSi-type monolith; FIG. 1b) corresponds to an $MSiS_{cross}$-type monolith; and FIG. 1c) corresponds to an $MS80_{HF}$-type carbon monolith.

It may be seen that the general form of the silica monolith used as template is identically reproduced by the carbon monolith via the $MSiS_{cross}$-type hybrid monolith. Also observed is a loss of volume of about 45% between the silica monolith and the corresponding carbon monolith; this loss of volume is due to a kind of compaction of the material caused by the elimination of the silica template during pyrolysis.

The appended FIG. 1 also shows an SEM micrograph of the macroscopic porous network of an MSi-type monolith (FIG. 1d)) and of the $MS80_{HF}$-type carbon monolith. In these figures, the white arrows indicate the external junctions of the pores while the black arrows on a white background indicate the internal junctions of the pores.

It may be seen that the structure of the macroporous network of the silica monolith is preserved in the corresponding carbon monolith, indicating that the latter is substantially an exact replica of the silica template used.

The results of the mercury intrusion measurements carried out on each of the carbon monoliths synthesized in this example are given in Table 1 below.

TABLE 1

| Monolith | $MS25_{HF}$ | $MS25_{carb}$ | $MS80_{HF}$ |
|---|---|---|---|
| Specific surface area ($m^2/g$) | 802 | 650 | 459 |
| Micropore volume ($cm^3/g$) | 0.34 | 0.25 | 0.18 |
| Micropore surface area ($m^2/g$) | 781 | 658 | 456 |

These results show that the carbon monoliths thus obtained are essentially microporous, with a micropore surface area ranging from 456 $m^2/g$ ($MS80_{HF}$) to 781 $m^2/g$ ($MS25_{HF}$).

Example 2

Hydrogen Storage in and Release from Carbon Monoliths

The carbon monoliths $MS25_{HF}$, $MS25_{carb}$ and $MS80_{HF}$ prepared above in Example 1 were used to store hydrogen, by heterogeneous nucleation of $LiBH_4$ within the micropores. The release of the hydrogen from the carbon monoliths was also studied.

1) Storage of Hydrogen by Heterogeneous Nucleation of $LiBH_4$

All the experiments on the heterogeneous nucleation of $LiBH_4$ in the carbon monoliths $MS25_{HF}$, $MS25_{carb}$ and $MS80_{HF}$ were carried out in a glove box in an atmosphere of purified argon. A 0.1M $LiBH_4$ solution was firstly prepared by dissolving 217 mg of $LiBH_4$ powder in 100 ml of MTBE at room temperature, with stirring. The carbon monoliths were vacuum-degassed at 300° C. for 12 hours before being impregnated with the $LiBH_4$ solution. The impregnation was carried out by placing 100 mg of each of the carbon monoliths in the 0.1M solution. After impregnation, the carbon monoliths were extracted from the $LiBH_4$ solution by filtration and dried under a low vacuum at room temperature. Three impregnation/drying cycles were thus carried out so as to increase the amount of $LiBH_4$ contained in the monoliths.

Solid-$LiBH_4$-containing carbon monoliths (composite monoliths), called $MS25_{HF/Li}$, $MS25_{carb/Li}$ and $MS80_{HF/Li}$ respectively, were thus obtained.

The amount of $LiBH_4$ contained in the monoliths was determined by measuring the Li content using atomic absorption spectroscopy (AAS) on a spectrometer sold under the brand name AAnalyst 300 by PerkinElmer, after the $LiBH_4$-containing monoliths were dissolved in a 1.0M hydrochloric acid solution. Typically, 50 mg of composite monolith were put into a flask containing 250 $cm^3$ of the 0.1M HCl solution and then the flask was placed in an ultrasonic oven for a time of 30 minutes. The solution obtained was analyzed by atomic absorption spectrometry. Standard solutions containing 1, 2 and 3 mg/l of Li were used beforehand in order to calibrate the spectrometer.

2) Hydrogen Release

The thermal decomposition of $LiBH_4$ included in the composite monoliths was studied by DSC (differential scanning calorimetry) in a stream of argon (100 ml/mm). To do so, approximately 8 mg of composite monolith were placed in a steel crucible fitted with a cover allowing gas evolution during heating. The cover was pierced at the last moment just before being handled. A heating rate of 2° C./min was used for each specimen.

The variation in dihydrogen evolution as a function of temperature was studied by a thermal desorption experiment coupled to a quadrupole mass spectrometer sold under the reference QXK300 by VG Scientific Ltd. To do so, approximately 5 mg of composite monolith were placed in a stainless steel tube 6 mm in diameter. This tube was connected to a low vacuum ($10^{-2}$ mbar). The TPD curves were obtained after heating the specimens to a temperature of 600° C. with a rate of temperature rise of 10° C./min. The desorbed gas was collected by the mass spectrometer. The dihydrogen evolution temperatures were determined from the variations in intensity of the m/z=2 peak.

The amount of dihydrogen evolution was quantified by volumetric measurements using the Sievert method (pressure variation in calibrated volumes) using the perfect gas law. More specifically, after degassing the composite monolith specimen under a low vacuum at room temperature, the amount of hydrogen desorbed was calculated every 50° C. for temperatures between 100 and 500° C. The calibrated volume in which the dihydrogen was collected was regularly evacuated so that the pressure was always below 1 bar. For each temperature, the amount of desorbed hydrogen was calculated after a total desorption time of 2 hours.

All the hydrogen contents given in this example are expressed as a percentage by weight relative to the total weight of the specimen ($LiBH_4$+carbon monolith).

3) Results

Figure 2:
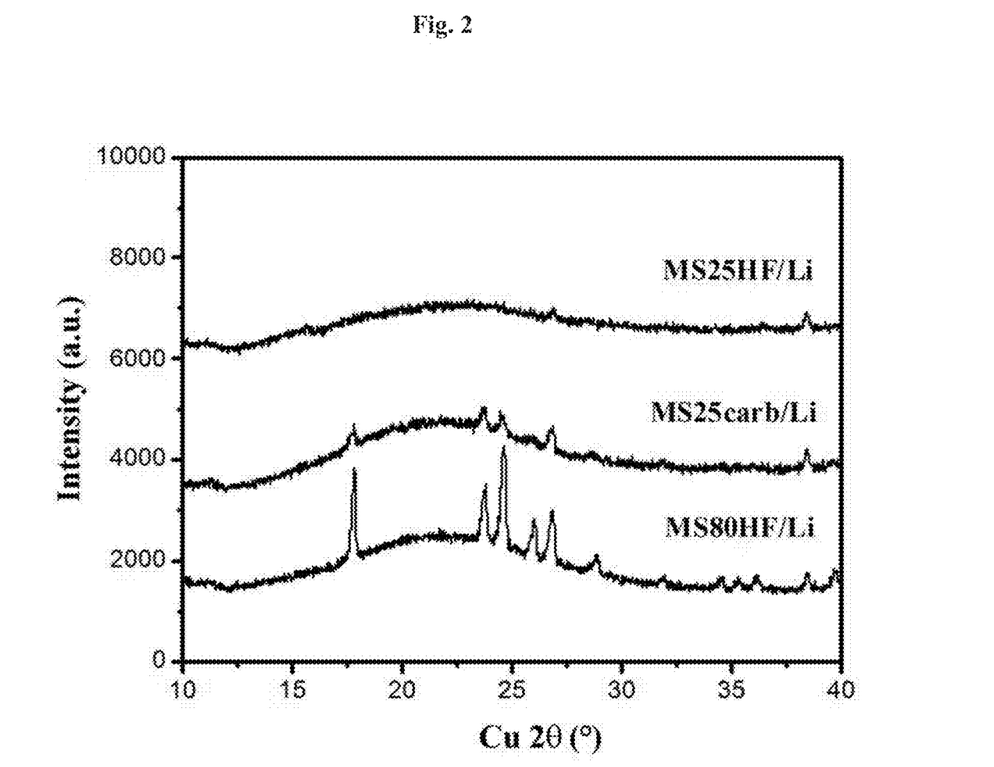
FIG. 2; shows the X-ray diffraction patterns of certain composite monoliths in accordance with one embodiment.

The appended FIG. 2 shows the X-ray diffraction patterns of the composite monoliths $MS25_{HF/Li}$, $MS25_{carb/Li}$ and $MS80_{HF/Li}$ each containing about 30% by weight of $LiBH_4$. In this figure, the intensity (in arbitrary units) is plotted as a function of the angle of diffraction in degrees.

These patterns demonstrate that the increase in microporosity within the host carbon monolith promotes heterogeneous nucleation of $LiBH_4$ in amorphous form. This is because, for the $MS80_{HF/Li}$ monolith, the micropore volume of which is 0.18 $cm^3/g$, well-defined diffraction peaks are observed that correspond to the low-temperature orthorhombic unit cell of $LiBH_4$ (Prima space group: a=7182 Å, b=4.439 Å, c=6.804 Å). When the micropore volume increases (in the case of the $MS25_{carb/Li}$ monolith, the micropore volume of which is 0.25 $cm^3/g$), a pattern is obtained in which the diffraction peaks are broader, which means that the $LiBH_4$ present in the $MS25_{carb/Li}$ monolith is in a less crystalline form than in the $MS80_{HF/Li}$ composite monolith. Finally, the pattern obtained with the composite monolith $MS25_{HF/Li}$, in which the micropore volume is 0.34 $cm^3/g$, i.e. approximately twice that in the composite monolith $MS80_{HF/Li}$, has no diffraction peak corresponding to the $LiBH_4$ crystals, which means that the solid $LiBH_4$ contained in the composite monolith $MS25_{HF/Li}$ is in a completely amorphous form.

Figure 3:
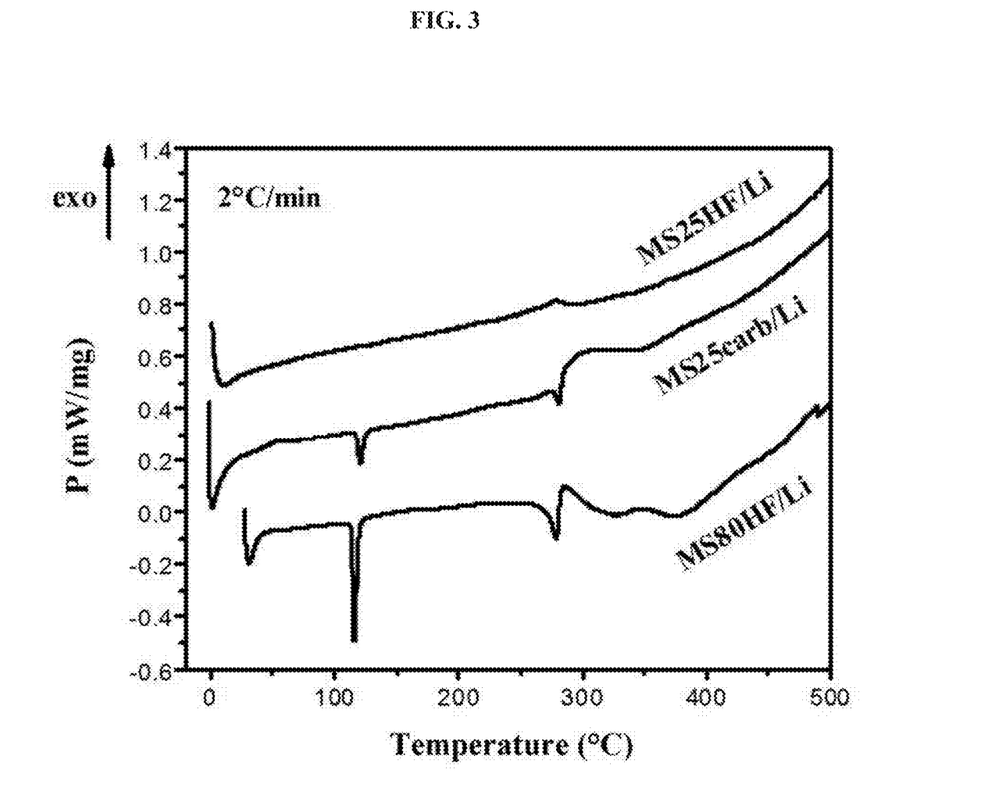
FIG. 3; is a DSC in which the heat flux (in mW/mg) is plotted as a function of the temperature (in ° C.) in accordance with one embodiment.

The loss of crystallinity of the $LiBH_4$ in the composite monolith $MS25_{HF/Li}$ is confirmed by DSC. The corresponding results are presented in the appended FIG. 3 in which the heat flux (in mW/mg) is plotted as a function of the temperature (in ° C.). With the $MS80_{HF/Li}$ and $MS25_{carb/Li}$ composite monoliths, the presence of an endothermic peak at 116° C. is observed, indicating that $LiBH_4$ undergoes a phase transition so as to pass from the low-temperature orthorhombic unit cell (Pnma) to a high-temperature phase ($P6_3mc$) (J.-P. Soulié et al., J. All. Comp., 2002, 346, 200). The second endothermic peak at 286° C. corresponds to the melting of $LiBH_4$. According to the literature, it is known that the desorption of hydrogen from LiBH$_4$ in powder form, that is to say not contained in a carbon monolith as used according to the present invention, takes place in two steps at a temperature above the melting point (via the formation of an intermediate decomposition product Li$_2$B$_{12}$H$_{12}$; S. Orimo et al., Appl. Phys. Let, 2006, 89, 219201) so as finally to form a mixture of LiH and boron. This type of LiBH$_4$ decomposition is observed in the MS80$_{HF}$ composite monolith, the hydrogen desorption giving rise to two broad endothermic peaks between 300 and 400° C. It may be seen that the peak corresponding to the hydrogen desorption from the composite monolith MS25$_{carb/Li}$ is modified, the change being even greater from the composite monolith MS25$_{HF/Li}$. This is because, despite the fact that the LiBH$_4$ content is the same for each of the composite monoliths (30 wt %), the desorption peak obtained from the MS25$_{HF/Li}$ composite monolith is very different as it may be seen that the endothermic peaks characteristic of the phase transition and the melting of LiBH$_4$ are absent. These results show that LiBH$_4$ does not crystallize in the orthorhombic form in the MS25$_{HF}$ monolith and confirm the X-ray diffraction results. Moreover, a small exothermic peak is observed at 280° C. in the case of the MS25$_{HF/Li}$ composite monolith, probably corresponding to the desorption of hydrogen. These results show that it is possible to modify the hydrogen desorption from the composite monoliths of the invention according to the micropore volume of the monoliths in which the heterogeneous nucleation takes place.

Figure 4:
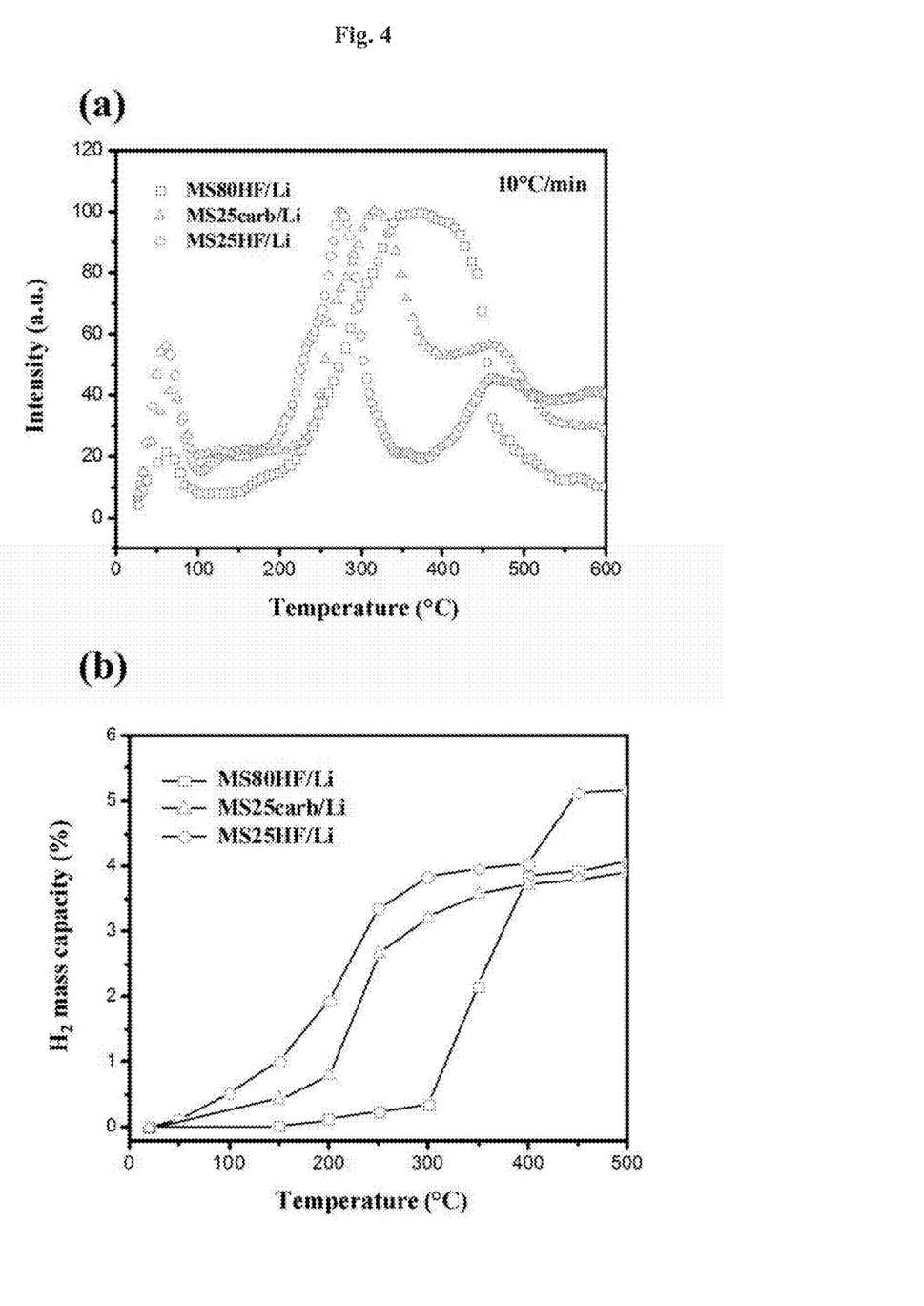
FIG. 4a shows the dihydrogen emission curves measured by thermodesorption coupled to a mass spectrometer on certain composite monoliths.
FIG. 4b shows the dihydrogen emission curves obtained by volumetric measurements using the Sievert method for each of the composite monoliths in accordance with embodiment.

The hydrogen desorption properties of the various composite monoliths are shown in the appended FIG. 4. FIG. 4a shows the dihydrogen emission curves measured by thermodesorption coupled to a mass spectrometer on the MS25$_{HF/Li}$, MS25$_{carb/Li}$ and MS80$_{HF/Li}$ composite monoliths. In this figure, the intensity of the m/z=2 peak is plotted as a function of the temperature in ° C., the curve with the open circles corresponding to the dihydrogen emission measured on the MS25$_{HF/Li}$ composite monolith, that with the open triangles corresponding to the MS25$_{carb/Li}$ composite monolith and that with the open squares corresponding to the MS80$_{HF/Li}$ composite monolith. FIG. 4b also shows the dihydrogen emission curves obtained by volumetric measurements using the Sievert method for each of the composite monoliths. In this FIG. 4b, the amount of desorbed hydrogen (in wt %) is plotted as a function of the temperature in ° C., the curve with the open circles corresponding to the dihydrogen emission measured on the MS25$_{HF/Li}$ composite monolith, that with the open triangles corresponding to the MS25$_{carb/Li}$ composite monolith and that with the open squares corresponding to the MS80$_{HF/Li}$ composite monolith.

In the desorption measurements carried out by TPD coupled to a mass spectrometer, no evolution of gas other than dihydrogen was observed. This observation is interesting insofar as it has been reported in the literature that the desorption of hydrogen from LiBH$_4$ may be contaminated by diborane B$_2$H$_6$ (J. Kostka et al., J. Phys. Chem. C, 2007, 111, 14026). FIG. 4a shows the variation in hydrogen desorption as a function of the micropore volume: the higher the micropore volume, the lower the hydrogen desorption temperature. The main hydrogen desorption peak for the MS80$_{HF/Li}$ composite monolith (micropore volume=0.18 cm$^3$/g) is centered at 370° C., whereas with the MS25$_{HF/Li}$ composite monolith (micropore volume=0.34 cm$^3$/g) the desorption takes place in a single step at a temperature of approximately 270° C. With the MS25$_{HF/Li}$ composite monolith, the temperature at which hydrogen starts to be desorbed is approximately 200° C., which corresponds to the temperature at which no hydrogen desorption from free LiBH$_4$, i.e. in powder form not contained in a solid support, is usually observed. These results demonstrate that the hydrogen desorption temperature may be adjusted by choosing the micropore volume of the carbon monoliths used in the heterogeneous nucleation of LiBH$_4$. These results are confirmed by the volumetric measurements carried out using the Sievert method and plotted in the appended FIG. 4b, in which it may also be seen that the amount of hydrogen desorbed at low temperature is larger the higher the micropore volume of the carbon monoliths used according to the invention.

The invention claimed is:

1. A method of storing hydrogen in a cellular solid material in the form of a porous carbon or ceramic monolith comprising a hierarchized porous network comprising macropores having a mean size d$_A$ of 1 μm to 100 μm, and micropores having a mean size d$_I$ of 0.7 to 1.5 nm, said macropores and micropores being interconnected and said material containing no mesoporous network, wherein said method comprises at least the following steps:
   a) a step of degassing said material under a secondary vacuum and at a temperature of 150 to 400° C.;
   b) a step of impregnating, at room temperature, said degassed material with a solution of a metal hydride dissolved in an organic solvent chosen from ethers;
   c) a step of drying the material impregnated with the metal hydride solution, said drying being carried out in a primary vacuum and at room temperature; and, optionally
   d) the repetition, one or more times, of steps b) and c) above.

2. The method as claimed in claim 1, wherein the degassing of the material in step a) is carried out at a temperature of 280 to 320° C.

3. The method as claimed in claim 1, wherein the duration of step a) varies from 2 to 24 hours.

4. The method as claimed in claim 1, wherein the metal hydride is chosen from hydrides of the following formula (I):

$$M(YH_4) \qquad (I)$$

in which M is selected from the group consisting of a lithium atom and a sodium atom and Y is selected from the group consisting of an aluminum atom and a boron atom.

5. The method as claimed in claim 1, wherein the ether solvents that can be used in step b) are selected from the group consisting of aliphatic ethers and cyclic ethers.

6. The method as claimed in claim 1, wherein the solvent for the metal hydride solution that can be used in step b) is methyl tert-butyl ether.

7. The method as claimed in claim 1, wherein the concentration of the metal hydride solution used in step b) varies from 0.05 to 5M.

8. The method as claimed in claim 1, wherein said macropores have a mean size d$_A$ of 4 μm to 70 μm.